R. PEARSON.
FIXATION OF THE NITROGEN OF THE ATMOSPHERE.
APPLICATION FILED FEB. 13, 1919.
1,372,541.   Patented Mar. 22, 1921.
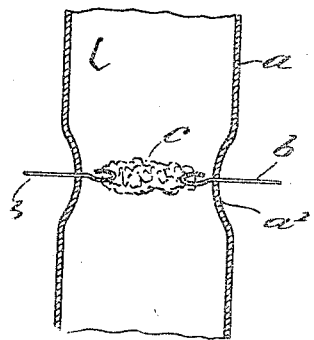
Witnesses.
Inventor
Richard Pearson
by
Attorney

UNITED STATES PATENT OFFICE.

RICHARD PEARSON, OF LONDON, ENGLAND.

FIXATION OF THE NITROGEN OF THE ATMOSPHERE.

1,372,541.  Specification of Letters Patent.  Patented Mar. 22, 1921.

Application filed February 13, 1919. Serial No. 276,847.

*To all whom it may concern:*

Be it known that I, RICHARD PEARSON, a subject of the King of Great Britain, residing in London, England, have invented a certain new and useful Fixation of the Nitrogen of the Atmosphere, of which the following is a specification.

This invention consists in subjecting a mixture of nitrogen and oxygen, commonly atmospheric air, to the joint action of electric sparks and of a catalyst having a temperature not below 300° C., by causing the mixture to pass through a mass of the catalyst which is either heated by the sparks or is directly in front of or behind the electric sparks in the passage for the mixture and is separately heated.

One mode of operating consists in filling or partly filling with a catalyst the space between the sparking electrodes. The sparks pass through and around the catalyst. The latter may be any that will withstand the temperature and chemical action of the gases, platinum black or platinized asbestos being the best known to use for the purpose.

Another mode consists in arranging the catalyst immediately before or behind the electrodes so that the sparks do not impinge upon it but serve to heat it. Or the catalyst may be separately heated to a temperature about 300° C. or upward, in which case it may be at some distance from the electrodes.

When the catalyst is between the electrodes it must not be capable of constituting an electrical conductor which would prevent formation of sparks.

The best apparatus at present known to us for applying the invention is illustrated in the accompanying drawing and consists of a tube $a$ of suitable material having a constriction at $a'$ where it is perforated for insertion of insulated electrodes such as platinum wires $b$ having looped ends. The space between these wires, which are at a distance from each other suitable for the length and intensity of spark required, is bridged by platinized asbestos $c$ supported by the wires. The air, or other mixture of oxygen and nitrogen, is forced or drawn continuously through the tube $a$ by any suitable contrivance, and in the region of the constriction $a'$, it comes under the joint action of the spark discharge produced by connecting the electrodes $b$ with a suitable source of current and of the heated catalyst $c$, a proportion of the gases combining to form oxid of nitrogen. The conditions of operating are those known to be best for combining nitrogen and oxygen by means of electric sparks. They vary with the composition of the mixture, its temperature and the speed of its travel.

An example of successful conditions for producing oxids of nitrogen from air in this apparatus having one spark gap is as follows:

| | |
|---|---|
| Air passing the electrodes per minute | 28 liters |
| Temperature of this air passed into the apparatus | 100° C. |
| Distance between platinum wire electrodes | $\tfrac{3}{8}$ inch |
| Potential at electrodes | 36,000 volts |
| Percentage of platinum in the platinized asbestos | $\tfrac{1}{4}$ |
| Weight of platinized asbestos | 43 grains |

Under these conditions the air issuing from the apparatus contains about 10 per cent. of its volume of oxids of nitrogen calculated as nitric oxid.

Having thus described the nature of the said invention and the best means I know of carrying the same into practical effect, I claim:—

1. A process for producing oxids of nitrogen from mixtures of nitrogen and oxygen which consists in subjecting the mixture to the joint action of electric sparks and of a catalyst having a temperature not below about 300° C. by causing the mixture to pass through a mass of the catalyst heated to such a temperature in proximity to the electric sparks.

2. A process for producing oxids of nitrogen from mixtures of nitrogen and oxygen which consists in subjecting the mixture to the joint action of electric sparks and of a catalyst having a temperature not below about 300° C. by causing the mixture to pass through a mass of the catalyst, which is heated to such a temperature by the electric sparks, substantially as described.

3. A process for producing oxids of nitrogen from mixtures of nitrogen and oxygen which consists in passing the mixture through a space in which electric sparks are passing and containing a mass of finely subdivided platinum heated to a temperature not below about 300° C.

4. A process for producing oxids of nitrogen from mixtures of nitrogen and oxygen which consists in passing the mixture through a space in which electric sparks are passing and containing a mass of finely subdivided platinum heated to a temperature not below about 300° C. by the electric sparks, substantially as described.

In testimony whereof I have signed my name to this specification.

RICHARD PEARSON.